United States Patent
Bruhn et al.

(10) Patent No.: US 11,339,700 B2
(45) Date of Patent: May 24, 2022

(54) OPERATING MATERIAL SUPPLY SYSTEM HAVING AN AIR SEPARATOR, MOTOR VEHICLE, AND METHOD FOR OPERATING AN OPERATING MATERIAL SUPPLY SYSTEM

(71) Applicant: Bayerische Motoren Werke Aktiengesellschaft, Munich (DE)

(72) Inventors: Andreas Bruhn, Puchheim (DE); Markus Wolf, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 17/279,693

(22) PCT Filed: Sep. 12, 2019

(86) PCT No.: PCT/EP2019/074354
§ 371 (c)(1),
(2) Date: Mar. 25, 2021

(87) PCT Pub. No.: WO2020/064352
PCT Pub. Date: Apr. 2, 2020

(65) Prior Publication Data
US 2021/0396169 A1    Dec. 23, 2021

(30) Foreign Application Priority Data
Sep. 26, 2018  (DE) ............. 10 2018 216 494.0

(51) Int. Cl.
*F02M 25/00* (2006.01)
*F01N 3/20* (2006.01)

(52) U.S. Cl.
CPC .......... *F01N 3/2066* (2013.01); *F02M 25/00* (2013.01); *F01N 2610/02* (2013.01);
(Continued)

(58) Field of Classification Search
CPC .............. F01N 3/2066; F01N 2610/02; F01N 2610/1453; F01N 2610/1466; F01N 2610/1486; F02M 25/00
(Continued)

(56) References Cited

U.S. PATENT DOCUMENTS

| 5,884,475 A | 3/1999 | Hofmann et al. |
| 9,156,000 B2 * | 10/2015 | Kawada .................. F01N 3/208 |

(Continued)

FOREIGN PATENT DOCUMENTS

| CN | 101330954 A | 12/2008 |
| CN | 103993936 A | 8/2014 |

(Continued)

OTHER PUBLICATIONS

International Search Report (PCT/ISA/210) issued in PCT Application No. PCT/EP2019/074354 dated Jan. 14, 2020 with English translation (seven (7) pages).

(Continued)

*Primary Examiner* — Hai H Huynh
(74) *Attorney, Agent, or Firm* — Crowell & Moring LLP

(57) ABSTRACT

An operating material supply system for a motor vehicle includes: i) at least one operating material container for storing operating material at risk of freezing; ii) at least one conveying device, which is designed to convey the operating material stored in the operating material container upstream in the direction of at least one injector, or in the opposite direction downstream, iii) at least one air separator, which is connected to the operating material container via a feed line; iv) at least one first injector line, which connects the air separator to at least one first injector. When the air separator is installed in the motor vehicle, a connector for the first injector line is distanced further from the roadway surface than a connector for the feed line.

10 Claims, 3 Drawing Sheets

(52) U.S. Cl.
CPC ............... *F01N 2610/1453* (2013.01); *F01N 2610/1466* (2013.01); *F01N 2610/1486* (2013.01)

(58) Field of Classification Search
USPC .......... 123/672; 60/295, 303, 304, 307, 311; 701/103–105
See application file for complete search history.

(56) References Cited

U.S. PATENT DOCUMENTS

| | | |
|---|---|---|
| 2010/0006517 A1 | 1/2010 | Folkvang |
| 2012/0160937 A1 | 6/2012 | Feistritzer et al. |
| 2014/0033681 A1 | 2/2014 | Dolenec |
| 2015/0096287 A1 | 4/2015 | Qi |
| 2015/0159536 A1 | 6/2015 | Hodgson et al. |

FOREIGN PATENT DOCUMENTS

| | | |
|---|---|---|
| CN | 104005820 A | 8/2014 |
| CN | 104612793 A | 5/2015 |
| DE | 10 2009 029 473 A1 | 3/2011 |
| DE | 10 2012 107 430 A1 | 2/2014 |
| EP | 2 693 014 A1 | 2/2014 |

OTHER PUBLICATIONS

German-language Written Opinion (PCT/ISA/237) issued in PCT Application No. PCT/EP2019/074354 dated Jan. 14, 2020 (seven (7) pages).

German-language Search Report issued in German Application No. 10 2018 216 494.0 dated May 9, 2019 with partial English translation (11 pages).

Chinese-language Office Action issued in Chinese Application No. 201980063082.5 dated Jan. 21, 2022 with English translation (18 pages).

* cited by examiner

OPERATING MATERIAL SUPPLY SYSTEM HAVING AN AIR SEPARATOR, MOTOR VEHICLE, AND METHOD FOR OPERATING AN OPERATING MATERIAL SUPPLY SYSTEM

BACKGROUND AND SUMMARY OF THE INVENTION

The technology disclosed here relates to an operating medium supply system for supplying operating medium to a motor vehicle. Furthermore, the technology disclosed here relates to a motor vehicle having an operating medium supply system of said type.

An operating medium supply system may be designed for example as an SCR system. In SCR systems, use is in some cases made of multiple injectors which inject the urea solution into the SCR catalytic converters. The injector lines that lead to said injectors are connected by way of a T-piece to the operating medium vessel. If the motor vehicle is shut down, the operating medium is drawn out of the injectors by suction again by means of the operating medium pump.

If the motor vehicle is set in operation again, then the composition of the additive-air mixture in the injector lines is initially unclear. Therefore, upon the next build-up of pressure, the mixing of air and additive results in an increase in the likelihood of dosing quantity errors and of pseudo errors during the dosing quantity plausibility check.

It is a preferred object of the technology disclosed here to alleviate or eliminate at least one disadvantage of a previously known solution, or propose an alternative solution. In particular, it is a preferred object of the technology disclosed here to provide more reliable dosing quantity monitoring. Further preferred objects may arise from the advantageous effects of the technology disclosed here. The object(s) is/are achieved by means of the subject matter of the independent patent claims. The dependent claims constitute preferred configurations.

The technology disclosed here relates to an operating medium supply system for the provision of operating media, which are at risk of freezing, in a motor vehicle. In particular, the operating medium supply system may provide an operating medium for the reduction of pollutants in exhaust gases of a motor vehicle. In another configuration, the operating medium supply system may provide water for the injection of water into an internal combustion engine.

A preferred operating medium is water or an aqueous solution, for example a urea solution (also referred to as additive). Such operating media can freeze during winter.

The operating medium supply system disclosed here comprises an operating medium vessel which forms the storage volume for storing the operating medium.

Furthermore, the operating medium supply system disclosed here comprises at least one conveying device which is configured for conveying operating medium which is stored in the operating medium vessel upstream in the direction of at least one injector or downstream in the opposite direction. In other words, the operating medium pump can be operated in two opposite conveying directions: upstream, operating medium is conveyed to the injector, and downstream, operating medium is pumped or drawn out of the injector by suction.

The injector of the operating medium supply system may have any suitable configuration for introducing the operating medium into the downstream reaction chamber (for example catalytic converter chamber of an SCR system, intake tract of an internal combustion engine, combustion chamber etc.). An operating medium injector per se is known to a person skilled in the art.

The operating medium supply system disclosed here furthermore comprises at least one air separator which is connected via a feed line to the at least one operating medium vessel. The air separator serves for separating off the air again from the operating medium-air mixture formed upon the shutdown of the motor vehicle (in particular the back-suction of operating media out of the injectors). The at least one feed line and the at least one injector line form the line system of the operating medium supply system.

According to the technology disclosed here, at least one first injector line connects the air separator to at least one first injector. In the installed position of the air separator in the motor vehicle, the connector for the first injector line is spaced apart further from the roadway surface than the connector for the feed line. In the context of the technology disclosed here, a "connector" is to mean the inlet or outlet to the internal volume of the air separator. In other words, therefore, in the installed state, the connector of the first injector line is arranged at a higher level than the connector for the feed line. Expediently, in the installed state, the connector for the feed line is arranged in a lower region of the air separator, whereas the connector for the first injector line is arranged in an upper region of the air separator. If air is now jointly drawn into the operating medium supply system by suction, the air can rise in the air separator.

The operating medium supply system may furthermore comprise at least one second injector line which connects the air separator to at least one second injector. The first injector, also referred to as close-couple injector, may for example be arranged in the engine compartment of the motor vehicle. The second injector, also referred to as underfloor injector, may for example be arranged in the underfloor region of the motor vehicle. Such an arrangement is used in particular in motor vehicles which are equipped with two SCR catalytic converters. Preferably, in the installed state of the air separator in the motor vehicle, the connector for the feed line may be spaced apart further from the roadway surface than the connector for the second injector line. In other words, therefore, in the installed position, the connector for the feed line to the operating medium vessel may be arranged at a higher level than the connector for the second injector line. The second injector line may expediently be designed such that, when the second injector is closed, operating medium does not flow from the air separator into the second injector line owing to gravitational force alone. For example, for this purpose, the flow cross section of the second injector line may be correspondingly small. If, upon the shutdown of the motor vehicle, the second injector line is evacuated by suction, renewed flooding with operating medium can advantageously be prevented. In general, as a result of the first and/or second injector line being evacuated by suction, the operating medium is for the most part removed. Here, at least such a quantity of operating medium is extracted by suction that the remaining operating medium can freeze without the operating medium supply system being damaged as a result.

In an alternative configuration, in the installed position of the air separator in the motor vehicle, the connector for the second injector line may be spaced apart further from the roadway surface than the connector for the feed line. In other words, in the installed position, the connector for the second injector line may also be arranged at a higher level than the connector for the feed line. In any case, such a configuration ensures that no operating medium can flow from the air separator into the second injector line for the underfloor injector.

The first injector line and/or the second injector line may each have a line section which, in the installed position of the air separator in the motor vehicle, projects into the air separator such that, in the case of every fill level of the air separator, an air cushion forms in the air separator above the inlet opening of the line section. As it were, such line sections may also be provided separately and fluidically connected to the respective injector lines. The line sections advantageously project into the air separator such that, in any case, an air cushion is trapped in the air separator. For example, for this purpose, the line sections may project vertically from above into the air separator in the installed position.

The operating medium supply system may be configured to:
i) toward the end or after the operation of an internal combustion engine of the motor vehicle, convey the operating medium downstream;
ii) upon renewed operation of the internal combustion engine, convey operating medium in the direction of the at least one injector (in particular of the first or second injector); and
iii) commence dosing quantity monitoring only after the operating medium supply system has been primarily filled with operating medium again.

The methods for dosing quantity monitoring and dosing quantity plausibility checking are familiar to a person skilled in the art.

The technology disclosed relates, as it were, to a motor vehicle having the operating medium supply system disclosed here.

The technology disclosed here furthermore comprises at least one method for operating an operating medium supply system. The method comprises the steps:
i) drawing operating medium out of at least one injector of the operating medium supply system by suction toward the end or after the operation of an internal combustion engine of the motor vehicle;
ii) separating off air from an operating medium-air mixture in at least one air separator of the operating medium supply system;
iii) conveying operating medium to the at least one injector upon renewed operation of the internal combustion engine; and
iv) starting dosing quantity monitoring only after the operating medium supply system has been primarily filled with operating medium again.

In the context of the technology disclosed here, "upon renewed operation of the internal combustion engine" refers to a time segment shortly before, during or after the commencement of the renewed operation of the internal combustion engine. For example, after starting of the engine, the operating medium may be conveyed only once an injector threshold temperature has been overshot.

In the context of the technology disclosed here, "primarily filled with operating medium" means that the line system is filled substantially exclusively with operating medium. In other words, it is thus the case that only such a negligibly small air quantity is present in the system that said air quantity in fact has no effect on the evaluation.

The technology disclosed here will now be discussed on the basis of the figures.

DETAILED DESCRIPTION OF THE DRAWINGS

Figure 1:
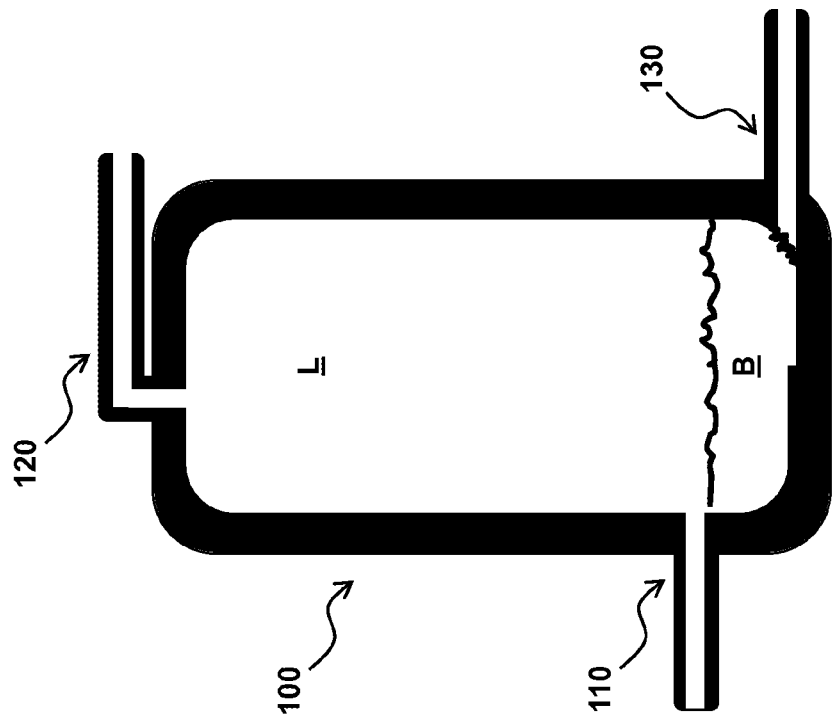
FIGS. 1-3 are schematic cross-sectional views of a first configuration of the technology disclosed here.

FIG. 1 shows a schematic cross-sectional view of a first configuration of the technology disclosed here. A feed line 110, a first injector line 120 and a second injector line 130 are connected to the air separator 100. In the installed position illustrated here, the connector for the feed line 110 is further remote from the roadway surface than the connector of the second injector line 130. In other words, the inlet/outlet from the feed line 110 into the interior of the separator 100 is arranged at a higher level than the inlet/outlet for the second injector line 130. Both the connector for the second injector line 130 and the connector for the feed line 110 are arranged here in the lower region of the air separator 100. Here, the first injector line 120 is arranged with its opening in the upper region of the air separator 100. The air separator 100 of the operating medium supply system is shown here in a state in which the operating medium has already been drawn back by suction. The fill level amounts here to approximately 70%. Air has collected in the upper part of the air separator 100.

Figure 2:
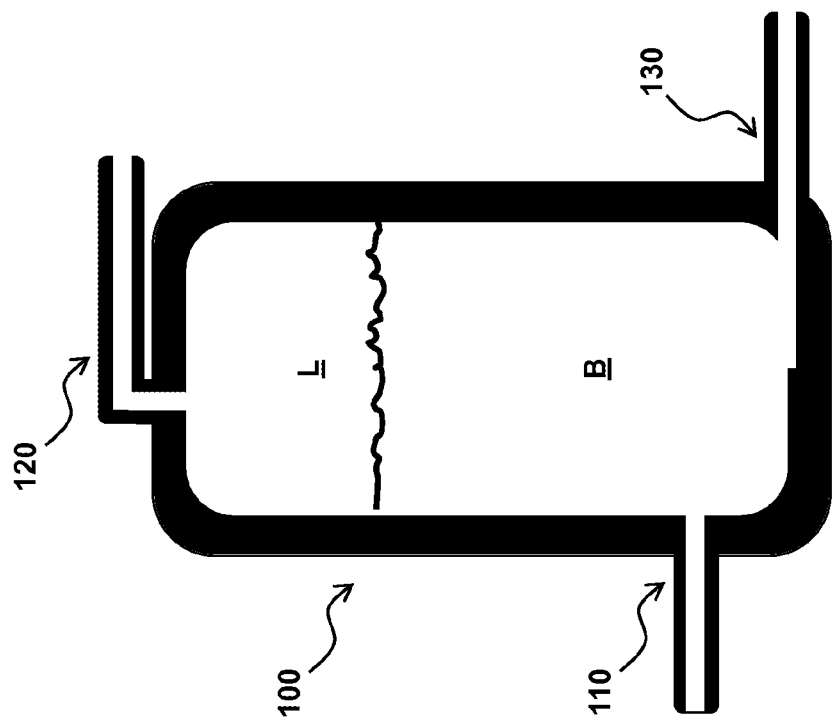

FIG. 2 shows a schematic cross-sectional view of the operating medium supply system as per FIG. 1 in a state in which the operating medium B has substantially been extracted by suction from the line system of the operating medium supply system. Since the connector for the feed line 110 is arranged at a higher level than the connector for the second injector line 130, a minimum fill level always exists in the air separator 100. As can be clearly seen, the operating medium B does not ingress into the second injector line 130. The second injector line 130 and possibly the first injector line 120 has/have previously been evacuated by suction. Here, at least such a quantity of operating medium has been extracted by suction that the operating medium that remains in the injector line(s) can freeze without the operating medium supply system being damaged as a result. Freezing-up of the second injector line 130 and of the injector can advantageously thus be reliably prevented.

Figure 3:
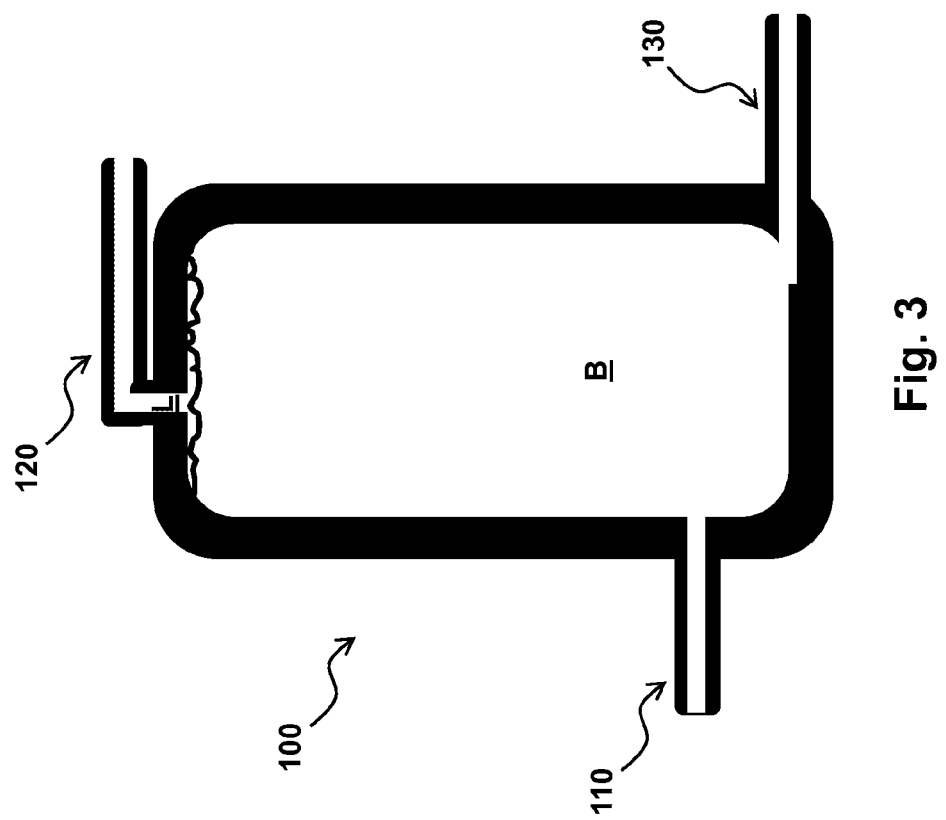

FIG. 3 shows a schematic cross-sectional view of the operating medium supply system as per FIG. 1 during the pressure build-up shortly before the operating medium B reaches the first injector line 120. The first injector line 120 may for example lead to the close-coupled first injector. The second injector line 130 is in this case likewise again filled with operating medium B.

Figure 4:
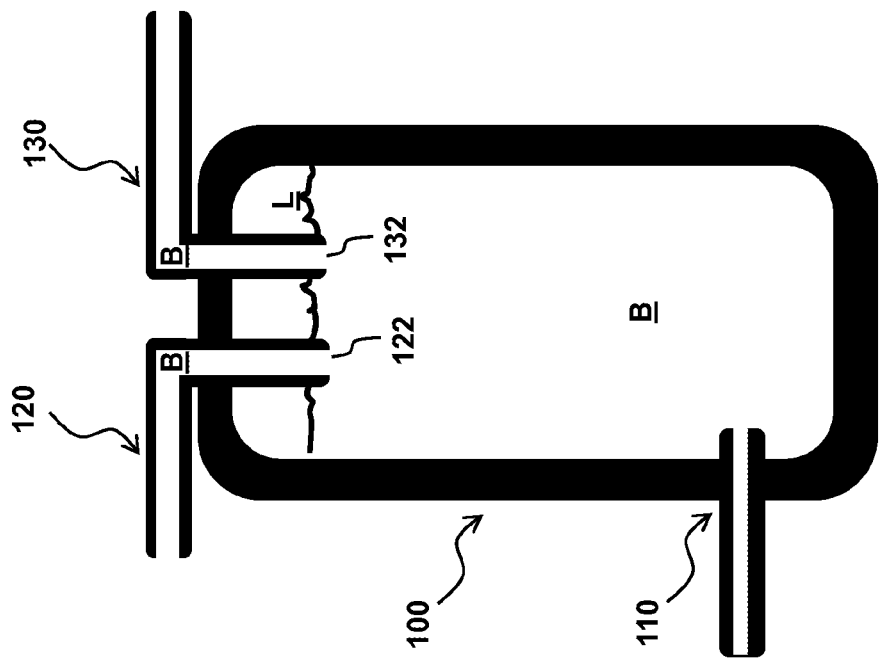
FIGS. 4-5 are further schematic views of a further configuration of the technology disclosed here.

FIG. 4 shows a further configuration of the technology disclosed here. The connection for the feed line 110 is again arranged in the lower region of the air separator 100. The air separator 100 is approximately half-filled with operating medium B. Air L has collected above this. The connectors for the first injector line 120 and for the second injector line 130 are in this case both arranged in the upper region of the air separator 100. Both the connector for the first injector line 120 and the connector for the second injector line 130 are spaced apart further from the roadway surface than the connector for the feed line 110. Here, in the air separator 100, two line sections are provided, which are fluidically connected in each case to the first injector line 120 and to the second injector line 130. In the installed position of the air separator 100 shown here, the line sections project in a vertical direction into the air separator 100.

A connector, arranged in the upper region, for the second injector line 130 to the underfloor injector is advantageous in particular if the injectors are not air-tight. For example, if a close-coupled first injector is not of air-tight design, the likelihood of operating medium flowing back into the underfloor injector can increase. In the case of a connector for the second injector line being formed on the top, this risk can be reduced. Furthermore, the two connectors situated on the top make it possible for both line sections to be evacuated by suction without air and operating medium being mixed.

Figure 5:
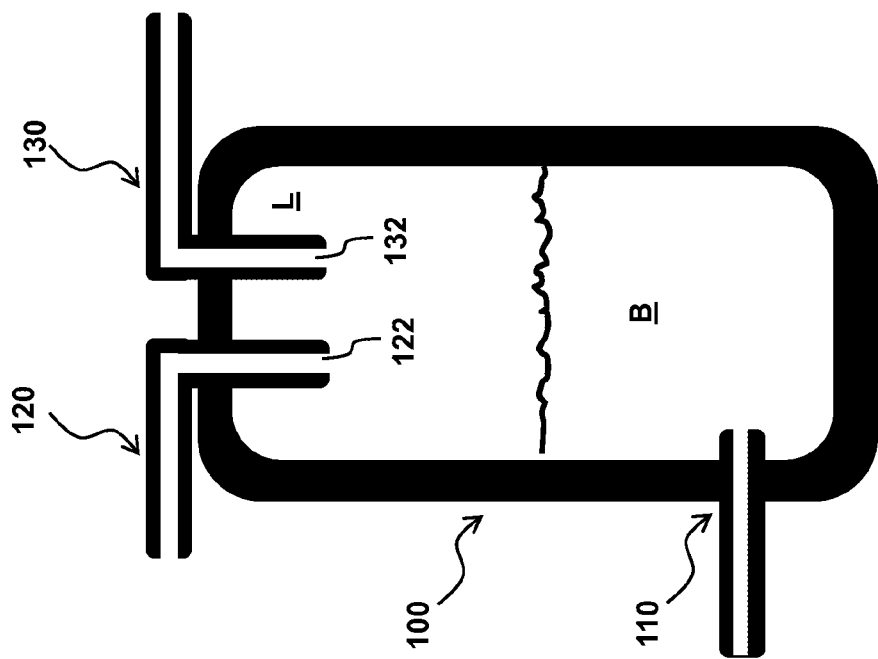

FIG. 5 shows the air separator 100 as per FIG. 4 in the filled state. This state arises for example if, for any reason, the operating medium has not been drawn back by suction or if the line system is flooded with operating medium B by the conveying device. In any case, in the air separator 100, a cushion filled with air L forms above the inlet openings 122, 132. If the motor vehicle is shut down in this state in winter, then the air cushion within the air separator 100 provides additional space for the freezing operating medium B. The line sections formed in this case as stubs thus form an enclosed air cushion as a means of protection against ice pressure.

The configurations shown in the figures serve merely for the purposes of illustrating the technology disclosed here. As it were, features of the figures may be combined. For example, the line sections shown in FIGS. 4 and 5 may also be implemented in the configurations as per FIGS. 1-3.

The technology disclosed is used in particular in SCR systems with at least two injectors, which are arranged spaced apart from one another, for the injection of operating medium into two SCR catalytic converters. In particular, the technology disclosed herein improves the dosing quantity monitoring and dosing quantity plausibility checking of an SCR system. In particular, during the commencement of operation of the SCR system, it is possible to more reliably predict, on the basis of the preceding air separation, from when the air has escaped from the operating medium supply system. If this is the case, then the dosing quantity monitoring can be reliably commenced. During the commencement of operation, always and reproducibly the same, preferably also minimal air quantity can be present in the second injector line to the second injector or underfloor injector. The risk of pseudo-errors can be reduced by means of the technology disclosed here.

For the sake of legibility, the expression "at least one" has in some cases been omitted for simplicity. Where a feature of the technology described herein is described in singular or indefinite terms, this is at the same time also intended to disclose a multiplicity thereof. In the context of the technology disclosed here, the expression "substantially" (for example "substantially vertical axis") encompasses in each case the exact characteristic or the exact value (for example "vertical axis") and deviations which are not of significance for the function of the characteristic/of the value (for example "tolerable deviation from vertical axis").

The above description of the present invention serves merely for illustrative purposes and not for the purposes of limiting the invention. In the context of the invention, various alterations and modifications are possible without departing from the scope of the invention and of its equivalents.

What is claimed is:

1. An operating medium supply system for a motor vehicle, comprising:
    at least one operating medium vessel for storing operating medium which is at risk of freezing;
    at least one conveying device which is configured for conveying the operating medium which is stored in the operating medium vessel upstream in a direction of at least one injector or downstream in an opposite direction;
    at least one air separator which is connected via a feed line to the operating medium vessel; and
    at least one first injector line which connects the air separator to at least one first injector; wherein, in an installed position of the air separator in the motor vehicle, a connector for the first injector line is spaced apart further from a roadway surface than a connector for the feed line.

2. The operating medium supply system according to claim 1, further comprising:
    at least one second injector line which connects the air separator to the at least one second injector.

3. The operating medium supply system according to claim 2, wherein
    the first injector is arranged in an engine compartment, and
    the second injector is arranged in an underfloor region.

4. The operating medium supply system according to claim 3, wherein,
    in the installed position of the air separator in the motor vehicle, the connector for the feed line is spaced apart further from the roadway surface than a connector for the second injector line.

5. The operating medium supply system according to claim 2, wherein,
    in the installed position of the air separator in the motor vehicle, the connector for the feed line is spaced apart further from the roadway surface than a connector for the second injector line.

6. The operating medium supply system according to claim 2, wherein,
    in the installed position of the air separator in the motor vehicle, a connector for the second injector line is spaced apart further from the roadway surface than the connector for the feed line.

7. The operating medium supply system according to claim 2, wherein the operating medium supply system is configured to:
    i) convey the operating medium downstream either toward an end of, or after, operation of an internal combustion engine of the motor vehicle;
    ii) convey operating medium in the direction of the at least one injector upon renewed operation of the internal combustion engine; and
    iii) commence dosing quantity monitoring after the operating medium supply system has been primarily filled with operating medium again.

8. A motor vehicle comprising an operating medium supply system according to claim 2.

9. The operating medium supply system according to claim 1, wherein
    at least one line section which is fluidically connected to the first injector line or to the second injector line is provided, which one line section, in the installed position of the air separator in the motor vehicle, projects into the air separator such that, in the case of every fill level of the air separator, an air cushion forms in the air separator above an inlet opening of the one line section.

10. A method for operating an operating medium supply system, comprising:
    i) drawing operating medium out of at least one injector of the operating medium supply system by suction toward an end of, or after, operation of an internal combustion engine of the motor vehicle;

ii) separating off air from an operating medium-air mixture in at least one air separator of the operating medium supply system;
iii) conveying operating medium to the at least one injector upon renewed operation of the internal combustion engine; and
iv) starting dosing quantity monitoring only after the operating medium supply system has been primarily filled with operating medium again.

* * * * *